United States Patent [19]

Dell

[11] 4,073,196
[45] Feb. 14, 1978

[54] CRANKING SYSTEM OF VARYING RADIUS

[75] Inventor: Basil Dell, Santa Ana, Calif.

[73] Assignee: Gilbert T. Hendren, Jr., Huntington Beach, Calif. ; a part interest

[21] Appl. No.: 714,190

[22] Filed: Aug. 13, 1976

[51] Int. Cl.² .............................................. F16H 37/12
[52] U.S. Cl. ..................................... 74/52; 123/197 R
[58] Field of Search ......... 74/52; 123/197 AC, 197 R

[56] References Cited

U.S. PATENT DOCUMENTS

| 1,326,129 | 12/1919 | Chadbourne | 74/52 |
| 2,023,250 | 12/1935 | Stalder | 74/52 |
| 2,088,332 | 7/1937 | Marchou | 74/52 |
| 3,791,227 | 2/1974 | Cherry | 74/52 |
| 3,886,805 | 6/1975 | Koderman | 74/52 |

*Primary Examiner*—Benjamin W. Wyche
*Assistant Examiner*—Wesley S. Ratliff, Jr.
*Attorney, Agent, or Firm*—William P. Green

[57] ABSTRACT

A composite crank mechanism including two interconnected coacting crank elements whose movements are timed by gears in a relation causing the radii of the two elements to be additive, and have a maximum combined effective crank radius in both of two opposite dead center positions, and to have a reduced combined overall radius in intermediate positions.

9 Claims, 5 Drawing Figures

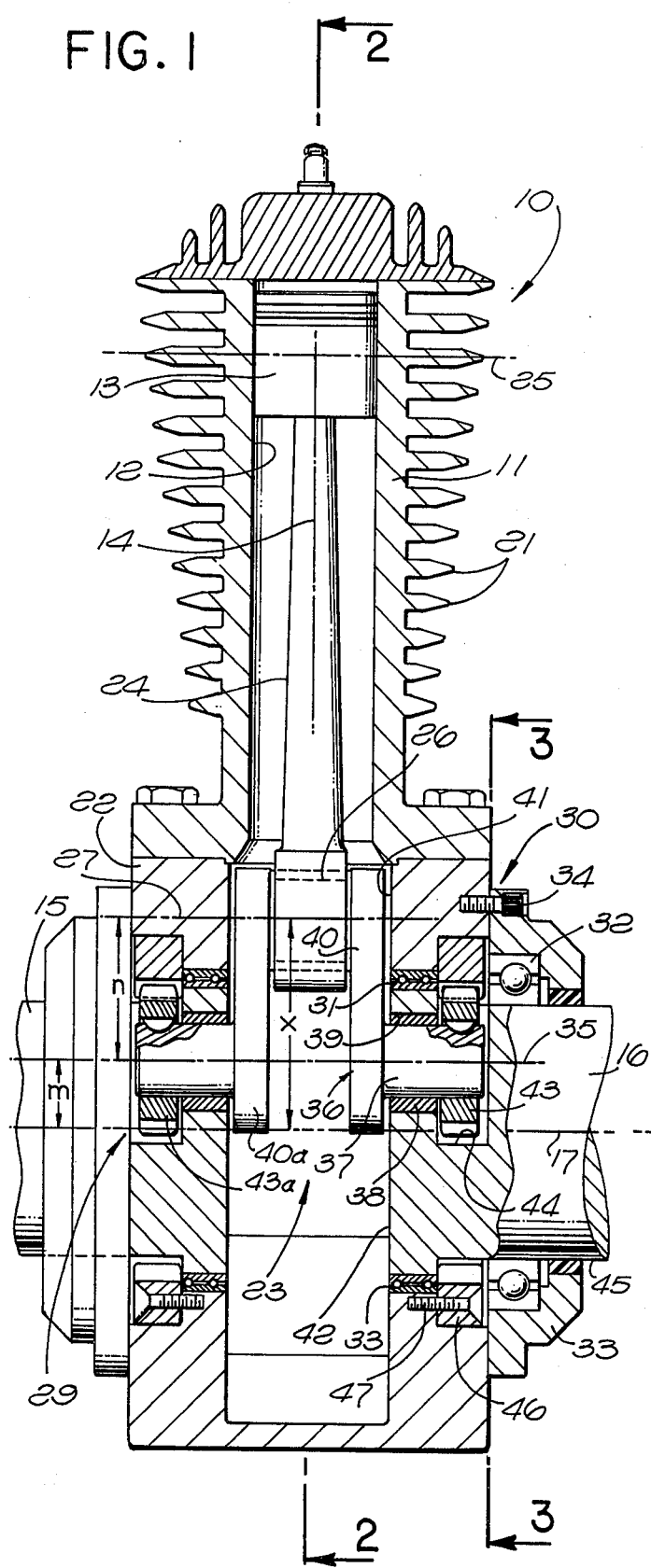

CRANKING SYSTEM OF VARYING RADIUS

BACKGROUND OF THE INVENTION

This invention relates to improved crank mechanisms adapted for use in any of numerous different types of apparatus in which it may be desired to convert a generally reciprocating type of motion to rotary motion, or vice versa, as for instance in driving a rotary shaft by a piston, or in driving a rotating wheel by pedals, as in a bicycle.

In a piston engine, the amount of horsepower produced by the engine is dependent in part upon the length of stroke of the piston or pistons, which in turn is determined by the effective radius of the crank throws to which the pistons are connected. In order to increase the output horsepower, it is desirable to lengthen the piston stroke and increase the crank radius. However, there have in the past been limits to the amount that the crank radius could be increased, since any such increase, besides lengthening the movement of the piston along its axis has had the associated adverse effect of correspondingly increasing the lateral movement of the crank throw and connecting rod end transversely of that axis. Excessive lateral movement of this type causes imposition of unwanted lateral forces by the piston against the cylinder wall, with rapid excessive wear of both of these parts, and in addition increases the size of the space which must be provided for reception of the crank shaft, and in general renders any increase in piston stroke beyond very narrow limits completely impractical. In a similar manner, the radius of a crank has been limited in other crank type mechanisms, as in a bicycle pedal assembly or other pedal actuated drive in which the length of the power stroke (downwardly in a bicycle) through which a user's foot can exert force through the crank mechanism cannot be increased without a corresponding unwanted increase in the front to rear motion of the foot.

SUMMARY OF THE INVENTION

The present invention provides a unique crank mechanism which has a crank throw whose effective radial distance from the main axis of rotation of the crank structure varies progressively as the crank turns about that axis. In particular, the mechanism is constructed to give the crank a maximum radius at both of two opposite dead center positions, that is, top dead center and bottom dead center in a piston and cylinder mechanism or the like, with the crank having a reduced effective radius circularly intermediate those two dead center positions. The minimum radius desirably occurs midway between and 90° from each of the dead center positions. In a piston and cylinder mechanism, this gives the piston a very long axial stroke with very small lateral movement of the connecting rod and crank throw transversely of the axis of the piston. Similarly, in a pedal actuated mechanism, the pedals may have a very long power stroke and very little lateral movement. In either case, the lateral movement can be reduced to zero by appropriate dimensioning of the parts.

Structurally, these results are achieved by forming the crank mechanism as a composite assembly of two coacting crank structures which are pivotally interconnected for relative movement in a manner such that in the two dead center positions the radii of the two crank elements are additive, to have the desired maximum combined effective crank radius, while in circularly intermediate positions the radii of the two cranks are subtractive with respect to one another to minimize the effective combined radius of the two. The movements of the two cranks are timed, preferably by a gear arrangement, so that the additive relationship of the crank radii is attained in the dead center positions, and the substractive relationship is attained between the dead center locations.

A first of the crank structures is mounted to turn about a first axis, with the second crank structure being connected to the first for relative pivotal movement about a second axis which is offset from and revolves about the first axis. The second crank structure then carries a crank throw which is offset from both of the axes and is rotatable about the second of the axes. A gear connected to the second crank structure for rotation therewith about its individual axis meshes with a second preferably stationary gear to maintain the rotary motion of the second crank structure about its axis in properly timed relation to the revolving movement of that second axis about the first and main axis of the device. The mentioned second gear desirably has twice as many teeth as the first gear to achieve an optimum timing relationship.

BRIEF DESCRIPTION OF THE DRAWINGS

The above and other features and objects of the invention will be better understood from the following detailed description of the typical embodiment illustrated in the accompanying drawings in which:

FIG. 1 is an axial section through a single cylinder reciprocating engine having a crank mechanism constructed in accordance with the invention;

FIGS. 2 and 3 are transverse sections taken on lines 2—2 and 3—3 respectively of FIG. 1;

DESCRIPTION OF THE PREFERRED EMBODIMENT

Figure 3:
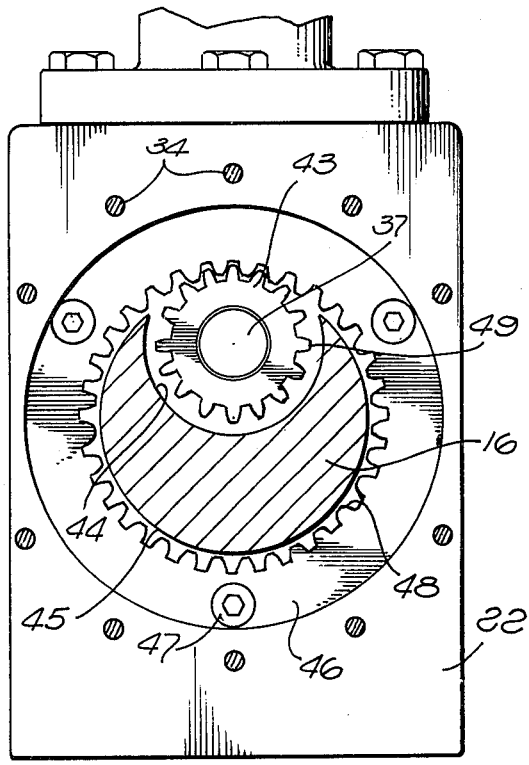

Referring first to FIG. 1, the engine 10 there represented includes a cylinder block 11 containing a cylindrical bore 12 within which a piston 13 is mounted for reciprocating movement along a vertical axis 14. Pressure developed in the upper end of the cylinder bore, above piston 13, forces the piston downwardly intermittently, to cause rotation of two aligned output shafts 15 and 16 about their common axis 17 which is perpendicular to and intersects reciprocal axis 14 of the piston. The engine is typically represented, in somewhat diagrammatic fashion, as a diesel engine, into whose cylinder diesel fuel is delivered through an injector 18 for admixture with air from a valved inlet passage 20, with the gases of combustion ultimately discharging from the cylinder chamber through a similarly valved exhaust passage (not shown). The cylinder block 11 may have external cooling fins 21, as shown.

Connected to the lower end of the cylinder block is a hollow crank case 22, which contains and mounts a composite crank mechanism 23 constructed in accordance with the invention. A connection rod 24 is pivotally connected at its upper end to piston 13 for relative pivotal movement about a horizontal axis 25, and is pivotally connected at its lower end to a crank throw 26 of mechanism 23, for rotary movement relative to throw 26 about a horizontal axis 27 parallel to the previously mentioned axes 17 and 25. Crank throw 26 may be externally cylindrical about axis 27, and be journaled within a bearing 28 carried at the lower end of the connecting rod.

At opposite sides of crank throw 26, the mechanism 23 may include two identical composite crank assemblies 29 and 30, which include and drive the two output shafts 15 and 16 respectively. It is contemplated that in some instances only one of the assemblies 29 or 30, or its equivalent, may be provided, but it is preferred that two identical assemblies be utilized as shown in order to better balance the overall mechanism. Since the two assemblies 29 and 30 are identical, only one will be described in detail, specifically the assembly shown in the right hand portion of FIG. 1.

The shaft 16 of assembly 30 is journaled for rotation about axis 17 by two aligned bearings 31 and 32 carried by the lower housing or crankcase structure 22. These bearings are desirably of the ball bearing type, with bearing 31 being received within a bore 33 at the inner side of the wall of the crankcase, and with bearing 32 typically being located by a bearing housing 33 secured by screws 34 to the outside of the crankcase structure. Both of these bearings may be constructed to function as thrust bearings as well as centering bearings, to locate shaft 16 axially in the position illustrated in FIG. 1.

The shaft 16 functions in essence as a first crank element of the composite crank assembly 30. The main axis of this first crank element is of course the main axis 17 of shaft 16, while the second or eccentric axis of this crank is represented at 35. Axis 35 is parallel to axis 17 and revolves about the axis as shaft 16 turns.

A second crank element 36 is connected to the first crank element for rotary movement relative thereto about eccentric axis 35, and for revolving movement about main axis 17. For this purpose, the second crank 36 has a cylindrical shaft portion 37 which is centered about axis 35 and projects through a bearing sleeve 38 mounted within an opening 39 in part 16. The sleeve 38 journals portion 37 of crank 36 for the desired rotary movement about axis 35, and carries a crank arm 40 which extends upwardly in FIG. 1 and is received closely adjacent inner surfaces 41 and 42 of the crankcase wall and shaft 16 respectively. These surfaces 41 and 42 are disposed transversely of axis 17 as shown. The upper end of crank arm 40 is connected to crank throw 26, whose opposite end is connected to the corresponding crank arm 40a of the second crank assembly 29.

Rightwardly beyond the sleeve bushing 38 of FIG. 1, shaft 37 rigidly carries a pinion gear 43 which turns with shaft 37 and arm 40 about axis 35, and which is closely but rotatably received within a recess 44 formed in shaft 16. When viewed in section transversely of axis 17, the recess 44 has the partial circular configuration illustrated in FIG. 3, with the pinion gear 43 being of a diameter to project radially outwardly beyond the diameter of the outer cylindrical surface 45 of shaft 16.

About the portion of shaft 16 which contains pinion gear 43, the wall of the crankcase structure 22 carries a ring gear 46, which is rigidly secured to the crankcase in stationary position by screws 47. Gear 46 has internal teeth 48 centered about axis 17 and dimensioned to mesh with the external teeth 49 of pinion gear 43, so that the pinion can roll circularly along the interior of the ring gear as between the various positions illustrated in FIGS. 2, 4 and 5. The number of internal teeth formed within ring gear 46 is preferably exactly twice the number of external teeth on pinion gear 43 to attain the timing relationship which will be discussed hereinafter.

To now describe a cycle of operation of the engine shown in the figures, assume first of all that piston 13, connecting rod 24 and all of the parts of crank mechanism 23 are initially in the top dead center positions of FIGS. 1 to 3. In that position, the piston is at the upper end of its range of travel, and connecting rod 24 extends directly vertically downwardly therefrom along axis 14 (FIG. 2). Also in that position, the axis 35 of the two crank arms 40 and 40a is directly above and vertically aligned with the main axis 17 of the two shafts 15 and 16, and similarly the axis 27 of crank throw 26 is directly above and vertically aligned with axis 35. Since all three of these axes are in a common vertical plane containing axis 14 and piston 13, the radial distance $m$ between axes 17 and 35 (that is, the effective radial length of the "first crank" formed by each of the shafts 15 and 16), is added to the radial distance $n$ between axes 27 and 35, (the effective radial length of the crank arms 40 and 40a), to attain a maximum overall radial length $x$ of the composite crank mechanism.

Figure 4:
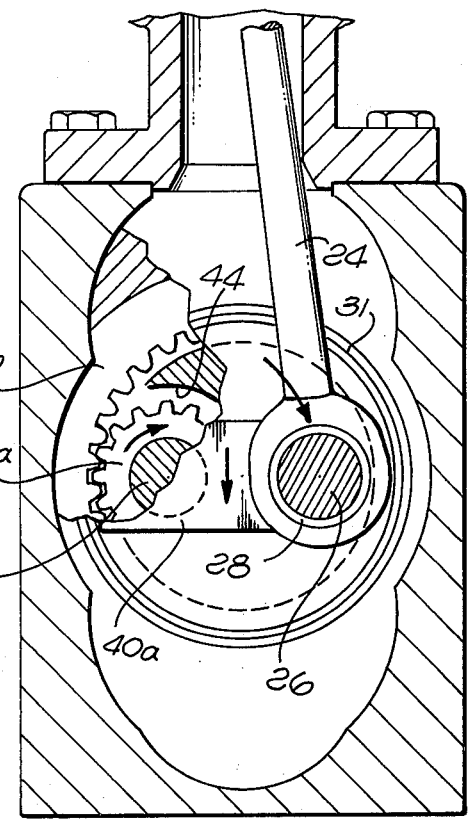
FIG. 4 is a view similar to FIG. 2, but showing the crank mechanism after being turned through 90° from the FIG. 2 setting.

As the piston 13 commences its downward travel from the position of FIGS. 1 to 3, the two crank arms 40 and 40a swing about their individual axis 35 to turn gears 43 and 43a about that axis in a manner causing those gears to roll along the inside of ring gear 46 toward the position of FIG. 4. In FIG. 4, the arms 40 and 40a have swung in a clockwise direction about their individual axis 35, while the gears 43 and 43a have revolved in a counterclockwise direction about the main axis 17, both through 90°. The revolving movement moves axis 35 leftwardly as it moves downwardly, so that the crank throw 26 in FIG. 4 is no longer the distance $x$ from main axis 17, but rather is much closer to that axis. In continuing downwardly toward the FIG. 5 position, arms 40 and 40a swing further in a clockwise direction about axis 35, while that axis and gear 43 return in a rightward direction to the FIG. 5 position, in which the three axes 17, 35 and 27 are again aligned in a common vertical plane containing axis 14, but with axis 35 in this instance being below axis 17, and axis 27 being below axis 35. Thus, in the FIG. 5 position, the two radial distances $m$ and $n$ are again additive, to locate the axis of crank throw 26 the maximum distance $x$ beneath main axis 17. During the second half of a revolution of shafts 15 and 16, gears 43 and 43a and the connected crank arms 40 and 40a continue their rotary and revolving movements through the intermediate position shown in broken lines in FIG. 5 and back to the initial top dead center position of FIGS. 1 to 3. The total vertical movement of crank throw 26 during this complete rotation is twice the distance $x$ of FIG. 1, while the total lateral movement of the crank throw (left to right in FIGS. 4 and 5) is the greatly reduced distance $y$. The stroke of piston 13 is thus very great relative to the lateral movement of the crank throw 26, to maximize horsepower output and minimize wear on the piston and cylinder which might be caused by exertion of lateral forces against the cylinder by the piston. Because of the provision of exactly twice as many teeth within ring gear 46 as on pinion gears 43 and 43a, the timing of the rotary and revolving movements is as described above, with arms 40 and 40a projecting directly upwardly and directly downwardly in the top dead center and bottom dead center positions respectively of gears 43 and 43*a*.

Figure 5:
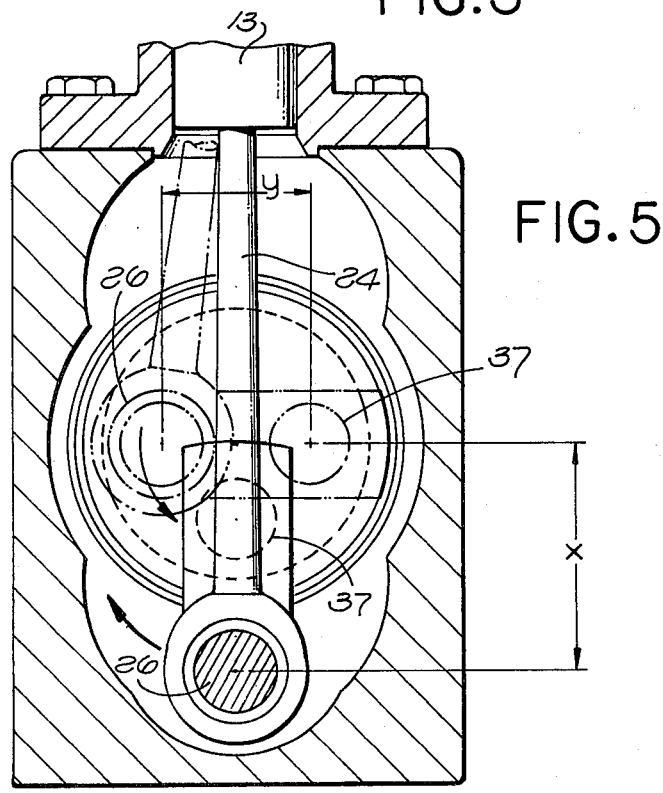
FIG. 5 is a view similar to FIGS. 2 and 4 but showing the bottom dead center position of the crank mechanism.

If it is desired to eliminate all lateral movement of crank throw 26, and have only reciprocating movement of that crank throw in opposite directions along axis 14, this result may be achieved by shortening crank arms 40 and 40*a* relative to the other parts to a condition in which the effective radial length *n* of these arms, between axes 27 and 35, is exactly equal to the radial distance *m* between axes 17 and 35 of the "first crank structure", so that when these two distances are in subtractive relation, in the FIG. 4 position and broken line position of FIG. 5, axis 27 intersects vertical axis 14 and is not offset therefrom.

In a pedal operated arrangement utilized the present crank mechanism, the piston, connecting rod and cylinder parts may be deleted, and the user's foot may exert force directly against crank throw 26. In such an arrangement, it is contemplated that only one of the mechanisms 29 or 30 would ordinarily be employed.

While certain specific embodiments of the present invention have been disclosed as typical, the invention is of course not limited to these particular forms, but rather is applicable broadly to all such variations as fall within the scope of the appended claims.

I claim:

1. A drive mechanism comprising:
   a first structure mounted to turn about a predetermined first axis;
   a second structure connected to said first structure for rotary movement relative thereto about a second axis which is offset from said first axis and revolves thereabout as said first structure turns;
   said second structure having a crank throw;
   a part operatively connected to said crank throw in power transmitting relation and for relative rotation about a third axis which is offset from said second axis to rotate thereabout as said second axis revolves about said first axis;
   a gear centered about said first axis and relative to which said two structures move; and
   a second gear connected to said second structure for movement therewith and meshing with said first gear and having one-half as many teeth as said first gear to maintain the rotary movement of said second structure about said second axis in a predetermined timed relation to the revolving movement of said second axis about said first axis, so that, in a first dead center position, said second axis is offset from said first axis in a predetermined direction and said third axis is offset from said second axis in the same direction, while in a second and opposite dead center position said second axis is offset from said first axis in a direction the opposite of said first direction and said third axis is also offset from said second axis in said opposite direction, whereby said third axis is spaced from said first axis a maximum distance in said dead center positions and shorter distances in positions intermediate said dead center positions;
   the spacing between said second and third axes being substantially greater than the spacing between said first and second axes so that, when the mechanism is in a position midway between said two dead center positions, said second and third axes are offset in opposite lateral directions from said first axis, and said third axis therefore follows a generally elliptical path about said first axis.

2. A drive mechanism as recited in claim 1, in which said first gear is a ring gear having internal teeth meshing with external teeth of said second gear.

3. A drive mechanism as recited in claim 1, including a piston mounted for reciprocating movement in said predetermined and opposite directions, said part being a connecting rod attached to said piston and rotatably attached to said crank throw.

4. A drive mechanism as recited in claim 1, including third and fourth structures constructed and movable in essentially the same manner as said first and second structures respectively and spaced axially therefrom, and third and fourth gears corresponding essentially to said first and second gears respectively and interconnecting said third and fourth structures in a timed relation corresponding to that of said first and second gears and first and second structures, said crank throw extending between and interconnecting said second and fourth structures for movement in unison.

5. A drive mechanism as recited in claim 4, including a piston mounted for reciprocating movement in said predetermined and opposite directions, said part being a connecting rod attached at one end to said piston and attached rotatably at an opposite end to said crank throw.

6. A drive mechanism as recited in claim 5, in which said first and third gears are ring gears internally engaged by external teeth of said second and fourth gears respectively.

7. A drive mechanism as recited in claim 1, in which said first gear is a ring gear having internal teeth engaged by external teeth of said second gear, said first structure containing a partial circular recess within which said second gear is rotatably mounted.

8. A drive mechanism as recited in claim 1, in which said first gear is a ring gear having internal teeth which mesh with external teeth on said second gear, said first structure having an outer surface of a diameter almost as great as the internal diameter of said internal teeth and received in close proximity thereto, said first structure containing a partial circular recess near its periphery within which said second gear is rotatably received.

9. A drive mechanism as recited in claim 1, in which the spacing between said second and third axes is approximately twice as great as the spacing between said first and second axes.

* * * * *